United States Statutory Invention Registration [19]

[11] Reg. Number: H945

Taliaferro et al. [43] Published: Aug. 6, 1991

[54] CONNECTING APPARATUS FOR TWO TUBULAR MEMBERS

[75] Inventors: William D. Taliaferro, DeSoto; Robert A. Lyons, Jr., Carrollton; Jerry C. Foster, Venus; Mark D. Rheinlander, Dallas; Stewart H. Fowler, Plano, all of Tex.

[73] Assignee: Otis Engineering Corporation, Dallas, Tex.

[21] Appl. No.: 590,896

[22] Filed: Oct. 1, 1990

[51] Int. Cl.[5] ..... F16L 25/00

[52] U.S. Cl. ..... 285/354; 285/286; 285/386; 285/416

[58] Field of Search ..... 285/354, 286, 287, 386, 285/416, 115

[56] References Cited

U.S. PATENT DOCUMENTS

| | | | |
|---|---|---|---|
| 565,411 | 8/1896 | King | 285/354 X |
| 1,939,242 | 12/1933 | Thaheld | 285/286 X |
| 2,148,746 | 2/1939 | Hampe et al. | 285/287 |
| 2,174,299 | 9/1939 | Whitney et al. | 265/286 X |
| 2,560,263 | 7/1951 | Wiegand et al. | 285/354 X |
| 4,802,645 | 2/1989 | Weihold | 285/354 X |

FOREIGN PATENT DOCUMENTS

| | | | |
|---|---|---|---|
| 2041130 | 9/1980 | United Kingdom | 285/416 |

*Primary Examiner*—Linda J. Wallace

[57] ABSTRACT

A connecting apparatus for two tubular members including an adapter sleeve extending over the end portion of one of the members in a coaxial relationship therewith and adapted to abutt the end of the other member. A threaded nut means extends over the adapter sleeve in engagement therewith, and is adapted to threadedly engage the outer surface of the corresponding end portion of the other member to connect the members together. The adapter sleeve increases in cross-section in a direction towards the end of the one member to decrease the stress on the latter member accordingly.

17 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONNECTING APPARATUS FOR TWO TUBULAR MEMBERS

BACKGROUND OF THE INVENTION

This invention relates to an apparatus for connecting two tubular members and, more particularly, to such an apparatus for connecting tubular members of a different diameter and wall thickness such as, for example, a section of reeled tubing and a pipe.

Reeled tubing has primarily been used to convey fluids such as water, hot oil, nitrogen, diesel fuel, corrosion inhibitors, foam acid, etc., downhole in an oil and gas recovery well. With the increase of the number of high angle and horizontal wells, the applications of reeled tubing has increased accordingly, since it can also be used to convey and operate downhole mechanical tools as well as data acquisition and transmission equipment in these environments.

The reeled tubing is usually wrapped around a hub of a large reel extending above surface and is passed through an injector head assembly which operates to drive the reeled tubing into a casing or liner disposed in the wellbore. In situations in which the reeled tubing is utilized to convey fluid, an above-surface fluid reservoir is provided and is connected to the reeled tubing by a pipe which extends from the reservoir into the hub of the reel. In these situations it becomes very critical to provide a strong and secure connection between the corresponding ends of the pipe and the reeled tubing. However, this is difficult since the pipe and the reeled tubing are usually of a different outside diameter, inside diameter and/or wall thickness.

SUMMARY OF THE INVENTION

It is therefore an object of the present invention to provide an apparatus for connecting reeled tubing to a piping system which is relatively strong yet easy to operate.

It is a further object of the present invention to provide a connecting apparatus of the above type in which the stress concentration on the reeled tubing caused by the connecting apparatus is gradual to minimize damage to the reeled tubing.

It is a still further object of the present invention to provide a connecting apparatus of the above type in which the connecting apparatus is connected to the reeled tubing in a manner to minimize corrosion as a result of passage of fluids through the reeled tubing.

Towards the fulfillment of these and other objects, the apparatus of the present invention comprises an adapter sleeve extending over the trailing end portion of the reeled tubing in a coaxial relationship therewith and adapted to abutt the end of the piping system. A threaded nut means extends over at least a portion of the adapter sleeve in engagement therewith, and is adapted to threadedly engage the corresponding surface of the corresponding end portion of the piping system. The adapter sleeve increases in cross-section in a direction towards the corresponding end of the reeled tubing to decrease the stress on the reeled tubing accordingly.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
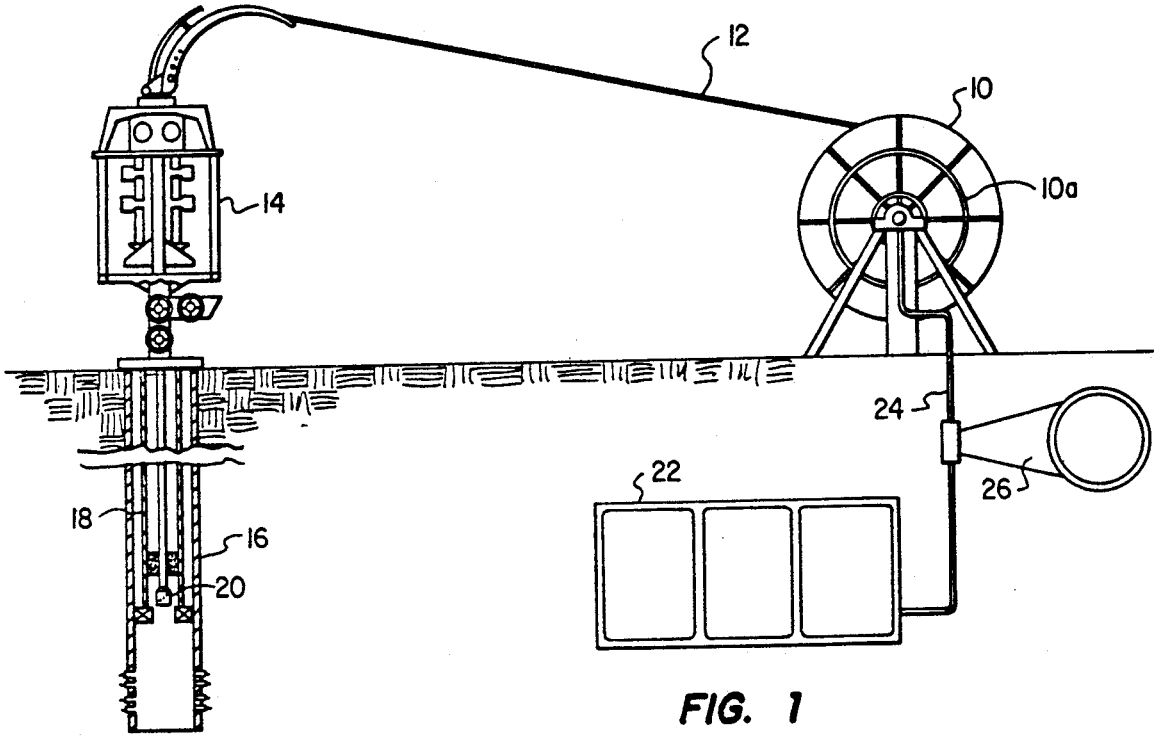
FIG. 1 is a partial schematic, partial elevational, partial sectional view depicting the environment in which the connecting apparatus of the present invention is preferably utilized.

Referring to FIG. 1 of the drawings, the reference numeral 10 refers in general to a reel which receives a supply of coiled, or reeled, tubing 12. The reeled tubing 12 is wrapped around the hub 10*a* of the reel 10 and passes through an injector head assembly 14 which operates in a conventional manner to drive the reeled tubing 12 into a casing or liner 16 disposed in a subterranean wellbore.

The reeled tubing 12 is normally inserted within a string of production tubing 18 located in the casing 16, and a tool 20 is normally connected to the leading end of the reeled tubing. The tool 20 can be designed to perform various operations in the production tubing 18 utilizing the circulation of fluids such as water, oil, nitrogen, diesel fuel, acid, corrosion inhibitors, hot oil, etc. To this end, the fluid is stored in a circulating tank 22 which is connected to a piping system 24 extending into a rotary swivel 25. It is understood that the piping system 24 extends from the rotary swivel 25, through the center shaft of the reel 10, and radially outwardly from the latter shaft where it is connected to the trailing end portion of the reeled tubing 12. A pump 26 is connected to the piping system 24 to pump the fluid from the tank 22 to the reeled tubing 12.

Figure 2:
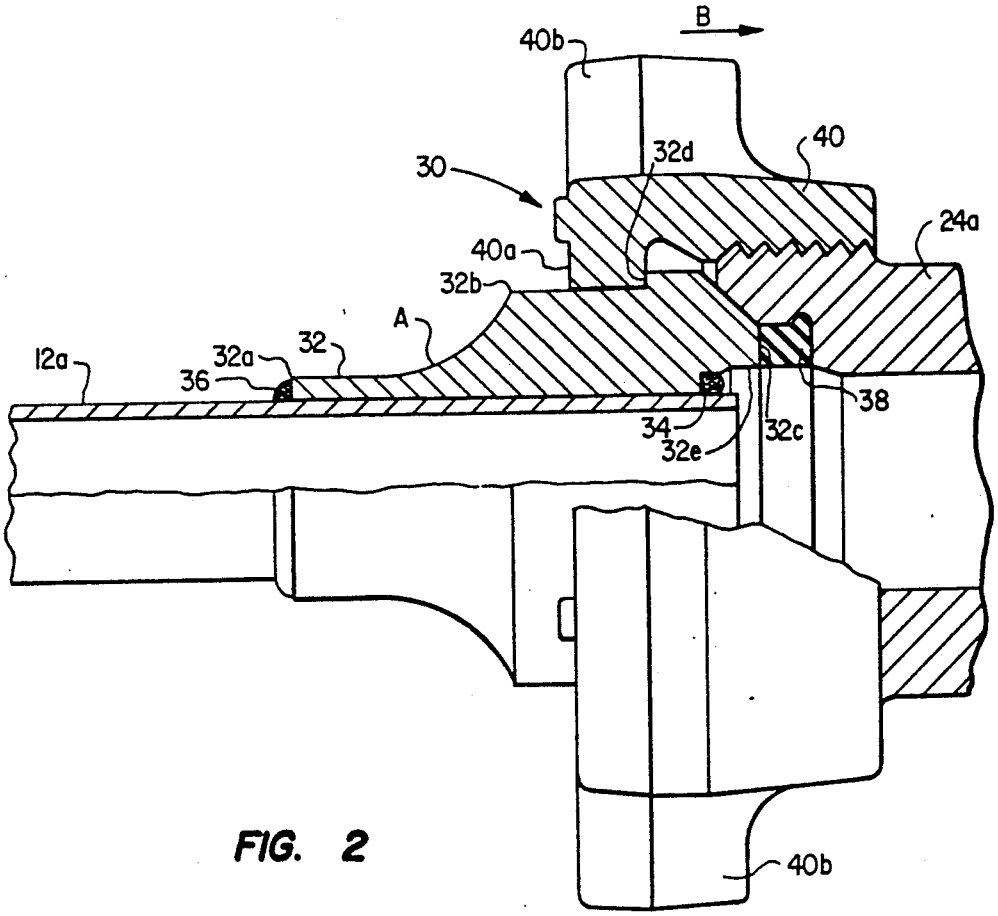
FIG. 2 is a horizontal cross-sectional view of the connecting apparatus of the present invention.

Referring to FIG. 2, the connector assembly of the present invention is shown in general by the reference numeral 30 and is designed to connect the trailing, or rear, end portion 12*a* of the reeled tubing 12 to the front end portion 24*a* of the piping system 24 within the hub 10*a*.

The connector assembly 30 includes an adapter sleeve 32 which telescopically receives the rear end portion 12*a* of the reeled tubing 12 in a relatively close fit. The outside diameter of the adapter sleeve 32 varies along its length from a relative small diameter at its front end 32*a* to a relatively large diameter in an area 32*b* intermediate this front end and its rear end 32*c*. The above variance in diameter is such that the profile of the front end portion of the adapter sleeve 32 is curved as shown by the reference letter A, for reasons that will be described. The remaining portion of the adapter sleeve 32 has a stepped outer diameter to define a shoulder 32*d*.

The bore of the adapter sleeve 32 is continuous for most of its length, but flares radially outwardly at its rear end portion to a larger diameter, as shown by the reference numeral 32*e*. The end portion 12*a* of the reeled tubing extends into this larger diameter bore portion 32*e* for reasons to be described. The inner surface of the sleeve 32 defining the bore that receives the end portion 12*a* of the reeled tubing 12 is notched and filled with a weld material 34 to weld the sleeve 32 to the tubing 12. The design is such that the rear end of the reeled tubing 12 projects outwardly from the weld material 34 for reasons to be described. A portion of the rear end 32*c* of the adapter sleeve 32 and a corresponding portion of the end of the piping system 24 are chamfered so as to engage as shown. A weld material 36 welds the front end 32*a* of the adapter sleeve 32 to a corresponding surface of the end portion 12*a* of the reeled tubing.

A seal ring 38 extends in a groove formed in the front end portion of the piping system 24 and abutts the non-chamfered portion of the rear end 32*c* of the adapter sleeve 32. The inner diameter of the seal ring 38 extends flush with the enlarged bore portion 32*e* of the adapter sleeve 32.

The outer surface of the front end portion 24*a* of the piping system 24 is threaded for receiving a corresponding internally threaded portion of a nut 40. The nut has an inwardly directed flange 40*a* formed its front end portion which engages the shoulder 32*d* of the sleeve 32 to secure the piping system 24 to the reeled tubing 12, via the adapter sleeve 32. Four hammer lugs 40*b* (two of which are shown in FIG. 2) project outwardly from the nut 40 and are spaced at ninety degree intervals.

In assembly, the reeled tubing 12 is inserted in the nut 40 and the nut moved forward (or to the left as viewed in FIG. 2) on the reeled tubing a distance to accommodate the adapter sleeve 32. The adapter sleeve 32 is placed over the end portion 12*a* of the reeled tubing 12 in the position shown in FIG. 2, and is welded to the reeled tubing by the weld materials 34 and 36.

The front portion 24*a* of the piping system 24, with the seal ring 38 inserted therein, is then placed in abutment with the rear end 32*c* of the sleeve 32, with the corresponding chamfered ends of the piping system 24 and the sleeve 32 in abuttment. The nut 40 is then advanced over the adapter sleeve 32 and towards the rear end of the reeled tubing 12 in the direction shown by the arrow B in FIG. 2 until the respective threads on the nut and the end portion 24*a* of the piping system 24 engage. The nut 40 is then rotated to advance it further until the flange 40*a* engages the shoulder 32*d* of the sleeve 32. This secures the piping system 24 to the reeled tubing 12.

It is thus seen that the connector assembly 30 provides a secure connection between the reeled tubing 12 and the piping system 24 yet can be done in an efficient manner. Also, stress concentration on, and attendant potential damage to, the reeled tubing 12 is minimized due to the gradual application of stress to the reeled tubing due to the tapered cross-sectional area of the adapter sleeve 32. Also, the weld material 34 minimizes corrosion between the adapter sleeve 32 and the reeled tubing 12 and protects the weld material 36. Further, a stagnant area is created around the weld material 34 by that portion of the reeled tubing 12 that projects outwardly from the latter material. Thus, fluid flow through the piping system 24 and the reeled tubing 12 will not cause erosion and impair the integrity of the weld material 34.

DESCRIPTION OF ALTERNATIVE EMBODIMENTS

According to an alternative embodiment, the weld material 36 is eliminated and the adapter sleeve 32 is connected to the end portion 12*a* of the reeled tubing 12 in another manner such as by shrink-fitting.

According to a second alternative embodiment the outer diameter of the adapter ring 32 can be reduced when compared to that of the nut 40 to enable the nut to be passed over the adapter sleeve (in a direction from right-to-left as viewed in FIG. 2) prior to assembly. Then a split ring (not shown), or the like, can be placed over the adapter ring 32 and secured thereto to provide a shoulder (equivalent to shoulder 32*d*) for engagement by the nut 40 during assembly. In this manner the adapter sleeve 32 can be secured to the end portion 12*a* of the reeled tubing 12 during manufacture and the assembly shipped to the field for connection to the piping system 24.

It is understood that several variations may be made in the foregoing without departing from the scope of the invention. For example, although the connecting apparatus of the present has been described in connection with connecting reeled tubing to a piping assembly, it is understood that it is also adaptable to connect other tubular members in the manner described above.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for connecting the respective end portions of two tubular members, said apparatus comprising adapter means extending over said end portion of one of said members in a coaxial relationship and adapted to engage said end portion of the other of said members; means for securing said adapter means to said one member; and threaded nut means extending over at least a portion of said adapter means and in engagement therewith, said nut means adapted to threadedly engage the corresponding surface of said end portion of said other member to connect said members together, said adapter means increasing in cross-section in a direction towards the end of said one member so that the stress on said one member decreases with said increase in cross-section.

2. The apparatus of claim 1 further comprising a seal ring disposed in the bore of said end portion of said other member and adapted to engage the end of said one member.

3. The apparatus of claim 1 wherein the respective engaging ends of said members are chamfered.

4. The apparatus of claim 1 wherein said adapter means is a sleeve having a stepped outer diameter to define a shoulder, and wherein said nut means has an inwardly projecting flange which engages said shoulder so that, upon advancement of said nut means towards said other member, said flange forces said sleeve against said other member.

5. The apparatus of claim 4 wherein one end of said sleeve is located proximate to said end of said one member and the other end of said sleeve is spaced from said one end, said shoulder extending between said ends and said sleeve increasing in cross-section between said other end and said shoulder.

6. The apparatus of claim 1 wherein said securing means comprises a first weld extending between one end of said adapter means and the corresponding surface of said one member, and a second weld extending between said adapter means and said one member and in a spaced relation to said first weld, to secure said adapter means to said one member.

7. The apparatus of claim 6 wherein fluid is passed through said connected members and wherein said end of said one member projects outwardly from said second weld to define a stagnant zone for said fluid between said latter end and said second weld.

8. Apparatus for connecting the respective end portions of two tubular members, said apparatus comprising adapter means extending over said end portion of one of said members in a coaxial relationship and adapted to engage said end portion of the other of said members; a first weld extending between one end of said adapter means and the corresponding surface of said one member; a second weld extending between said adapter means and said one member and in a spaced relation to said first weld to secure said adapter means to said one member, and threaded nut means extending over at least a portion of said adapter means and in engagement therewith, said nut means adapted to threadedly engage the corresponding surface of said end portion of said other member to connect said members together.

9. The apparatus of claim 8 further comprising a seal ring disposed in the bore of said end portion of said other member and adapted to engage the end of said one member.

10. The apparatus of claim 8 wherein the respective engaging ends of said members are chamfered.

11. The apparatus of claim 8 wherein said adapter means is a sleeve having a stepped outer diameter to define a shoulder, and wherein said nut means has an inwardly projecting flange which engages said shoulder so that, upon advancement of said nut means towards said other member, said flange forces said sleeve against said other member.

12. The apparatus of claim 11 wherein fluid is passed through said connected members and wherein the corresponding end of said one member projects outwardly from said second weld to define a stagnant zone for said fluid between said corresponding end and said second weld.

13. Apparatus for connecting the respective end portions of two tubular members through which fluid is passed, said apparatus comprising adapter means extending over said end portion of one of said members in a coaxial relationship and adapted to engage said end portion of the other of said members; a weld extending between said adapter means and the corresponding surface of said one member to secure said adapter means to said one member, the corresponding end of said one member projecting outwardly from said weld to define a stagnant zone for said fluid between said latter end and said weld; and threaded nut means extending over at least a portion of said adapter means and in engagement therewith, said nut means adapted to threadedly engage the corresponding surface of said end portion of said other member to connect said members together.

14. The apparatus of claim 13 further comprising an additional weld extending between said adapter means and said one member and in a spaced relation to the first-mentioned weld.

15. The apparatus of claim 13 further comprising a seal ring disposed in the bore of said end portion of said other member and adapted to engage the end of said one member.

16. The apparatus of claim 13 wherein the respective engaging ends of said members are chamfered.

17. The apparatus of claim 13 wherein said adapter means is a sleeve having a stepped outer diameter to define a shoulder, and wherein said nut means has an inwardly projecting flange which engages said shoulder so that, upon advancement of said nut means towards said other member, said flange forces said sleeve against said other member.

* * * * *